(12) United States Patent
Malmberg et al.

(10) Patent No.: US 6,680,809 B1
(45) Date of Patent: Jan. 20, 2004

(54) WRITE HEAD CURRENT DAMPING WITH DYNAMIC COUPLING

(75) Inventors: James Ernest Malmberg, Tucson, AZ (US); Larry LeeRoy Tretter, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/689,376

(22) Filed: Oct. 12, 2000

(51) Int. Cl.[7] .............................. G11B 5/02; G11B 5/09
(52) U.S. Cl. ............................ 360/68; 360/46; 327/110
(58) Field of Search ..................... 360/46, 68; 327/108, 327/110

(56) References Cited

U.S. PATENT DOCUMENTS

| 4,159,489 A | 6/1979 | Braitberg ..................... 360/65 |
| 4,314,288 A | 2/1982 | Gyi .............................. 360/65 |
| 4,722,010 A | 1/1988 | Suzuki et al. ................. 360/46 |
| 5,291,385 A | 3/1994 | Vinciarelli .................... 363/20 |
| 5,566,060 A | 10/1996 | Shimer et al. ................ 363/65 |
| 5,856,740 A | 1/1999 | Rau et al. .................... 323/233 |
| 5,880,626 A | * 3/1999 | Dean ........................... 360/46 |
| 6,128,146 A | * 10/2000 | Ngo ............................ 360/46 |
| 6,297,919 B1 | * 10/2001 | Pidutti et al. ................ 360/46 |

* cited by examiner

Primary Examiner—Regina N. Holder
(74) Attorney, Agent, or Firm—Edmund P. Pfleger

(57) ABSTRACT

A write head circuit is provided having improved transient and steady state response. The circuit includes a dynamically coupled damping circuit that is coupled to the write head during transient periods of a write signal to substantially reduce or eliminate overshoot generated by a write head cable. During steady state or data writing periods, the damping circuit is decoupled from the write head to prevent unnecessary loading of the write head. In preferred embodiments, the damping circuit includes a resistor in series with a capacitor, and the damping circuit is coupled in parallel to the write head. The resistor substantially reduces the overshoot of a write signal supplied to the write head, while the capacitor decouples the resistor from the write head during steady state or data write periods.

13 Claims, 3 Drawing Sheets

WRITE HEAD CURRENT DAMPING WITH DYNAMIC COUPLING

BACKGROUND OF THE INVENTION

1. Field of the Invention

The present invention relates to a write head current damping circuit with dynamic coupling. More particularly, the present invention relates to a write head current damping circuit which minimizes high frequency ringing in write driver circuits, thereby minimizing current overshoot during a transient response period, while maintaining maximum write current drive to the write head.

2. Description of Related Art

Generally, a write driver circuit for a tape product is used to write data onto a tape. FIG. 1 is circuit diagram of a conventional write head/cable circuit 100. The write head/cable load 10 consists of an inductive/capacitive (reactive) and resistive loads. To write data to tape, the write head is driven with alternating polarities of a DC current, $I_s$. By flipping the polarity of the load current, $I_s$, domains on a tape are set, thereby writing data to the tape. In the example of FIG. 1, data signal D and its compliment D_ are inputs into inverter 2 and inverter 4, respectively. Each of inverter 2 and inverter 4 receive write voltage, $V_s$, from the source 6 and output either 0 or $V_s$ volts alternatively, depending on whether D is high or low. Resistor, $R_s$ loads the head/cable 10 to deliver current, $I_s$, to the head.

FIG. 2 is the equivalent of the write driver circuit 100 of FIG. 1, including write driver 6, and the write head/cable 12, where driver 6 is the source, and load 10 is composed of the write head and cable. Voltage source, $V_s$, is the output voltage of write driver 6, and $V_{o(s)}$ is the voltage across the load 10. $Z_s$ is the output impedance of write driver 6. As a general statement, the cable operates to couple the write driver 6 to the write head so that power may be supplied from $V_s$ to the write head. $C_c$ represents the capacitance of the cable. $R_h$ and $L_h$ represent the resistance and inductance respectively, i.e. reactance, of the head. For ease of explanation, where source impedance, $Z_s$, is a resistor, $R_s$, circuit analysis of write driver circuit of FIG. 2 results in the following equation (equation 1) for $V_{o(s)}$:

$$V_{o(s)} = (R_h/(R_h + R_s)) * \frac{[1 + (L_h/R_h)]s}{1 + [R_s R_h C_c/(R_s + R_h) + L_h/(R_s + R_h)]s + [R_s L_h C_c/(R_s + R_h)]s^2} * V_s \quad \text{(Eq. 1)}$$

The denominator on the right side represents a second order system, wherein there is a damping factor proportional to the coefficient, $[R_s R_h C_c/(R_s+R_h)+L_h/(R_s+R_h)]$, of the first order term. Inherently, the reactance of the coupling cable introduces high frequency ringing during transient response, thereby generating an overshoot in the transient response of load current. This is illustrated by current overshoots 20a and 20b of waveform 20 in FIG. 5. Waveform 20 represents the alternating write driving signal to the head and generally includes a transient period and a steady state period, where data is written during the steady state period. As seen in waveform 20, the aforementioned damping factor does little to minimize the overshoot.

In applications that require faster current rise times in response to an increase in tape speed and/or faster data writing capabilities, one solution in the art has been to reduce the inductance of the cable. However, a lower inductance causes a decrease in the damping factor, and therefore, an increase in overshoot.

Various current damping circuits for minimizing overshoot in write circuits are known. One such technique is illustrated by the equivalent write driver circuit of FIG. 3. In this approach, a damping resistor, $R_D$, is placed in parallel with the write head. The resultant modifications of source resistance, $R_s$, and source voltage, $V_s$ (with respect to equation 1 above):

$R_s$ is replaced by $R_s (R_D/(R_D+R_s))$ $V_s$ is replaced by $V_s (R_D/(R_D+R_s))$ Note that $R_s$ and $V_s$ are both decreased by the introduction of $R_D$. The decreased $R_s$ increases the term, $L_h/(R_s+R_h)$, of the damping factor, $[R_s R_h C_c/(R_s+R_h)+L_h/(R_s+R_h)]$. Note that $R_D$ does not significantly effect the term, $R_s R_h C_c/(R_s+R_h)$, since $R_s$, which is significantly greater than $R_h$, exists both in the numerator and denominator. While this increase in damping factor effectively reduces the overshoot, the damping resistor also loads the driver circuit, which reduces $V_s$ in equation 1 above, thereby reducing the current available to the write head. This is illustrated by the decreased DC current drive of waveform 22 of FIG. 5. One solution to this consequence has been to increase the drive capability of the write driver to handle the added loading of the damping resistor. This solution requires that it be feasible to increase the drive capability of the write driver, which is not always the case. Further, the excess power supplied by the driver is not utilized for the write head, and is dissipated as heat.

As is apparent from the discussion above, these techniques have failed to minimize the overshoot characteristic of a write signal while preventing an unnecessary load to the write driver circuitry.

SUMMARY OF THE INVENTION

Accordingly, the present invention solves the aforementioned drawbacks of the prior art by limiting or removing the overshoot during the transient response period of a data writing signal supplied to a write head, without loading the write head during steady state (data writing) periods.

In one embodiment, the present invention provides a write head current damping circuit. The circuit includes a write head cable coupled to write head, the write head and the cable receiving a write signal. The circuit also includes a damping circuit comprising a damping element. Preferably, the damping circuit is adapted to couple the damping element to the write head during a transient period of the write signal, and also adapted to decouple the damping element from the write head during a steady state period of the write signal.

In another embodiment, the present invention provides a write head current damping circuit, comprising a write head defining a reactive load; a write head cable coupled to the write head and defining an impedance load; and a damping circuit coupled to the write head, and defining a damping load to a write signal during a transient response period of the write head and the cable, and further defining an open circuit during a steady state period of the write head and the cable.

In method form, the present invention provides a method for damping the transient response of a write head comprising the steps of: supplying a write signal to a write head; coupling a damping element to the write head during a transient period of the write signal; and decoupling said damping element from said write head during a steady state period of the write signal.

It will be appreciated by those skilled in the art that although the following Detailed Description will proceed with reference being made to preferred embodiments and methods of use, the present invention is not intended to be limited to these preferred embodiments and methods of use. Rather, the present invention is intended to be limited only as set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF THE EXEMPLARY EMBODIMENTS

Figure 4:
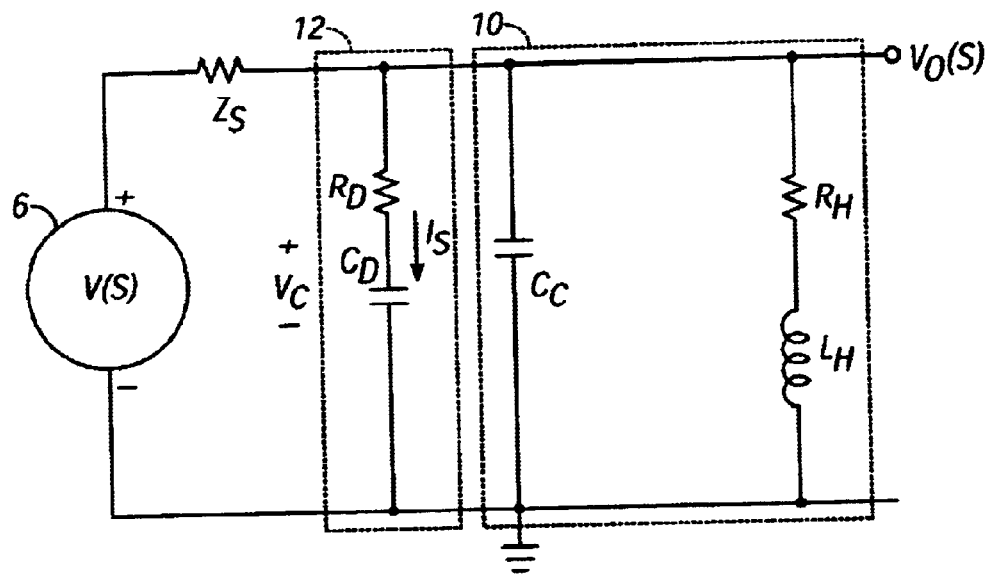
FIG. 4 is an equivalent circuit diagram of a write driver head and cable with a transient response current damping circuit according to the present invention.

FIG. 4 is an equivalent circuit diagram 300 of a write driver head and cable with a transient response current damping circuit 12 according to the present invention. The transient response damping circuit 12 essentially comprises a capacitive load, $C_D$, in series with a resistive load, $R_D$. This load is placed in parallel with the equivalent circuit 10 of the write head/cable as shown in the Figure. $R_D$ is most preferably selected to minimize or eliminate the transient response overshoot of the write signal, $V_s$ during a transient response period. $C_D$ decouples $R_D$ during a steady state (or data writing) period, thereby preventing an unnecessary loading of the write driver circuit 10 during the data writing period.

When source voltage switches from low to $V_s$, current, $I_c$, flows through the damping capacitor, $C_D$, charging the capacitor, and through damping resistor, $R_D$, thereby damping the overshoot as described above in reference to FIG. 3. As apparent to one skilled in the art, the current through $C_D$ is characterized by $I_c=C_D (dV_c/dt)$. While $V_C$ across the damping capacitor is increasing, $dV/dt>0$, thereby allowing for current, $I_c$, to flow through the capacitor, $C_D$, and damping resistor, $R_D$. When $V_c$ reaches a steady state voltage defined by DC source voltage, $V_s$, $dV/dt$ goes to 0. Further, $I_c=C_D (dV_c/dt)=0$, and no current flows in the damping circuit 12 removing the damping effect of $R_D$ from the circuit. Therefore, in steady state, the circuit of FIG. 4 resembles the circuit of FIG. 2.

Likewise, since the damping resistor $R_D$ is removed after the transient period, the maximum DC drive current is delivered to the write head 10 during steady state. Also, when source voltage switches from $V_s$ to low, $V_c$ decreases, increasing $dV_c/dt$ and thereby increasing current, $I_c$, and damping the overshoot with damping resistor, $R_D$. When $V_c$ reaches the DC low, the circuit returns to steady state, opening damping circuit 11, and maximum current drive to the write head 10. Advantageously, during steady state response, damping capacitor, $C_D$, acts as a voltage source, thereby supplying additional write driving current proportional to $R_D$.

Figure 1:
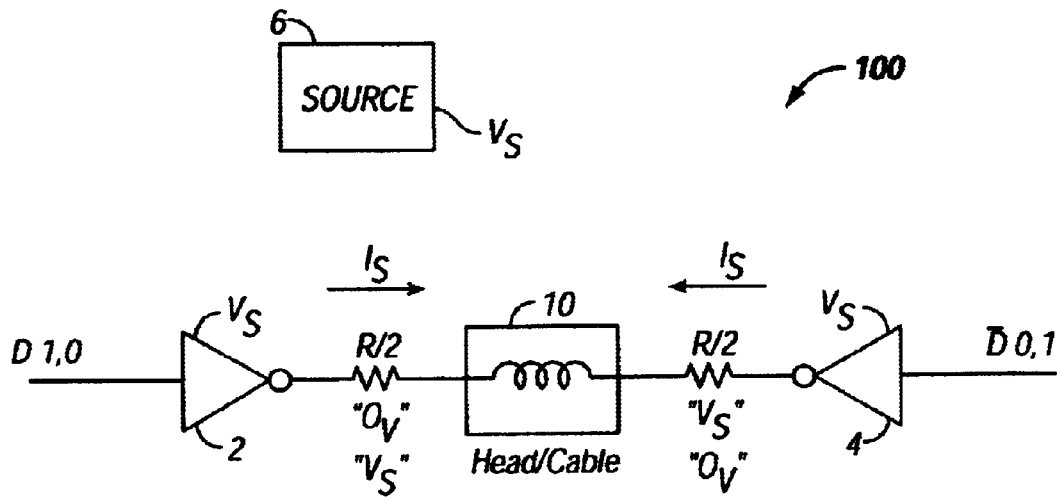
FIG. 1 is a circuit diagram of a write head/cable circuit.
Figure 2:
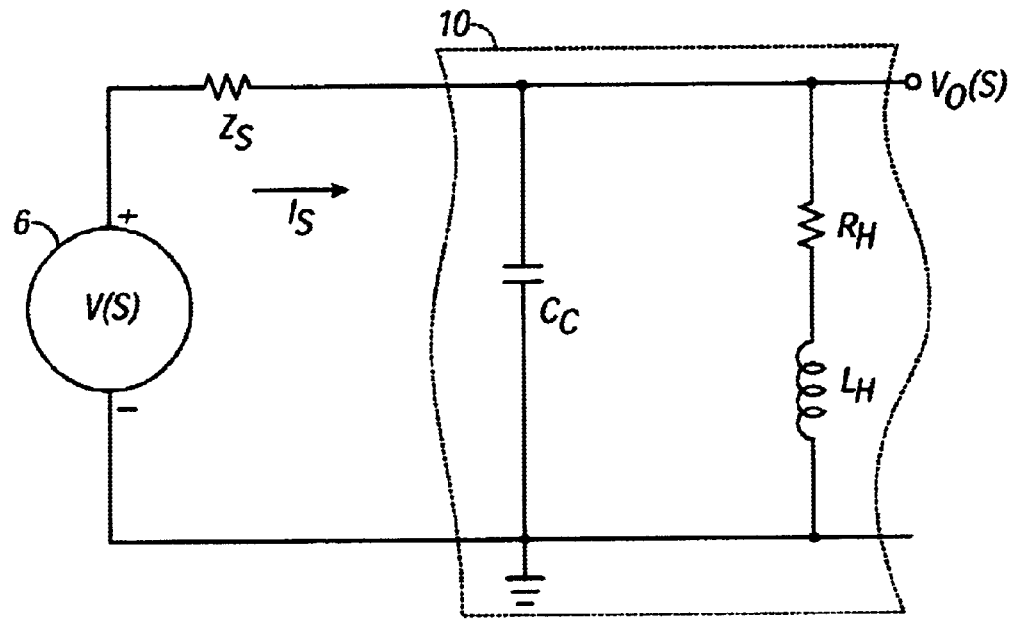
FIG. 2 is an equivalent circuit of the write driver head and cable of the prior art.
Figure 3:
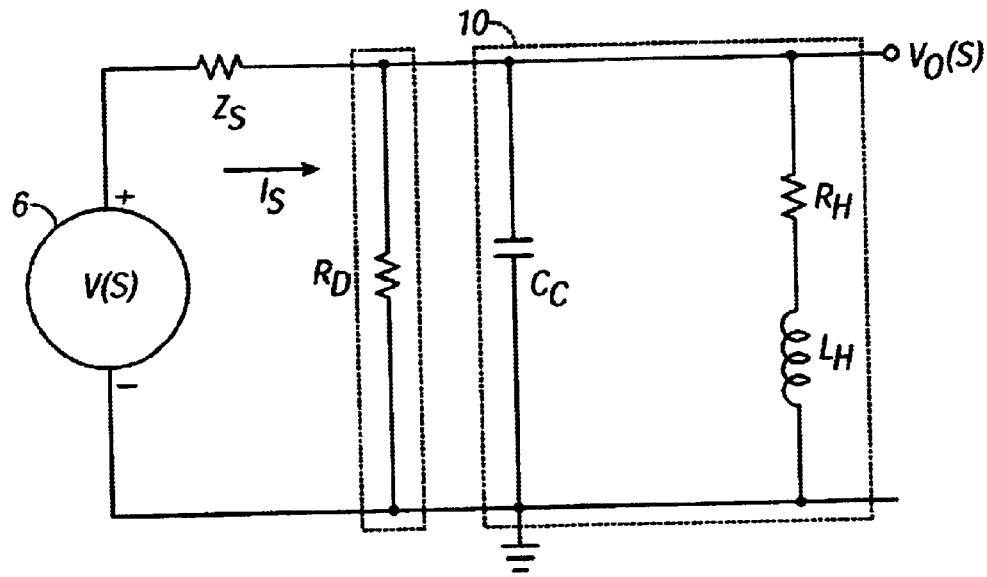
FIG. 3 is another equivalent circuit of the write driver head and cable of the prior art.
Figure 5:
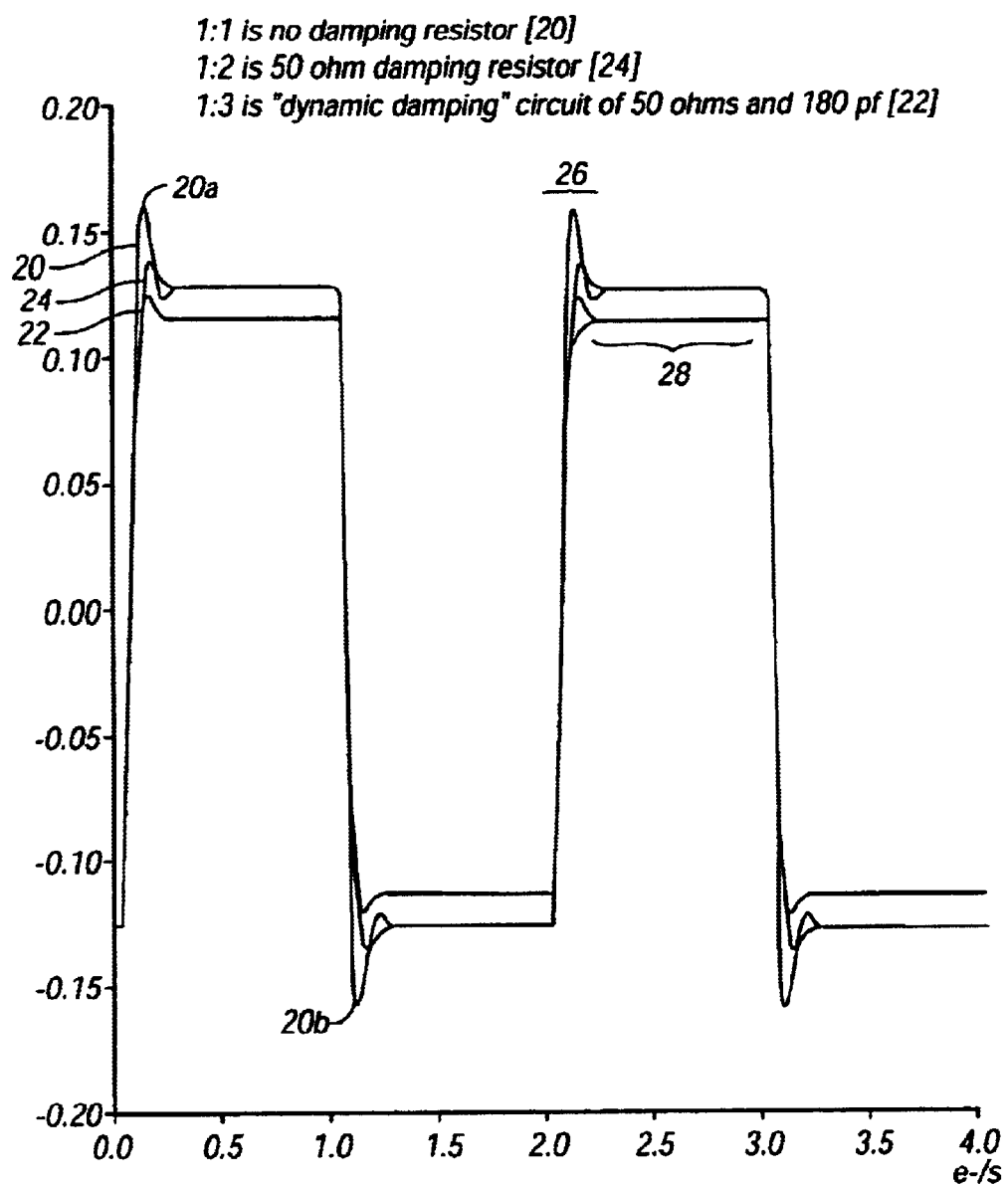
FIG. 5 is a set of simulations for the equivalent circuits of FIGS. 2, 3, and 4.

FIG. 5 represents a set of circuit simulations for the circuits of FIGS. 2 and 3, and FIG. 4. The signals 20, 22 and 24 represent the response ($V_{oS}$) of the circuits of FIGS. 2, 3 and 4, respectively, of a data write signal. The signals include a transient response period 26 and a steady state or data writing period 28. As indicated, where the load 10 operates at a constant DC current at either polarity, it is in steady state. Signal 20 (FIG. 2) depicts an underdamped response, having the largest overshoot 20a during the transient response period. Signal 22 (FIG. 3) depicts a dampened overshoot, but a reduced write current during steady state. Signal 24 in the response of the circuit of the present invention (FIG. 5) demonstrates that the overshoot is substantially removed compared with signal 20. Also, the steady state value is approximately equal to the steady state value of signal 20, i.e., unloaded during steady state.

Thus, it is apparent that the present invention solves the aforementioned drawbacks of write head driver circuits. Importantly, since the overshoot portion of the data writing signal is decreased by the damping circuit 12, faster switching speeds and faster data writing capabilities are achieved. Those skilled in the art will recognize numerous modifications may be made to the present invention. For example, the capacitive load, $C_D$, may be comprised of two or more capacitive elements in series or in parallel. Likewise, the resistive load, $R_D$, may comprise one or more resistive elements and or reactive elements.

Further modifications may also be made. For example, although not shown in the drawings, the damping capacitor, $C_D$, may be replaced with a controllable switch, that is controlled to switch on (e.g. conducting) during the transient period and off (e.g. not conducting) during the steady state period. Also, it should be apparent that the damping circuit 12 of the present invention may be replaced by a more complex passive network, or a network containing nonlinear components. These and other modifications are deemed within the spirit and scope of the present invention only as limited by the following claims.

What is claimed is:

1. A write head current damping circuit, comprising:
   a write head cable coupled to a write head, said write head and said cable receiving a write signal;
   a passive damping circuit comprising at least one resistor and at least one capacitor in series, said capacitor coupling said resistor to said write head during a transient period of said write signal and decoupling said resistor from said write head during a steady state period of said write signal.

2. A circuit as claimed in claim 1, further comprising a write driver circuit supplying said write signal to said cable and said write head.

3. A circuit as claimed in claim 1, wherein an equivalent circuit of said cable and said write head comprises an inductive load coupled to a reactive load, respectively.

4. A circuit as claimed in claim 1, wherein said write signal comprises alternating polarities of a DC signal, and wherein the transition between said alternating polarities defines said transient period.

5. A circuit as claimed in claim 1, wherein said damping circuit decreases an overshoot value of said write signal during said transient period.

6. A circuit as claimed in claim 1, wherein said steady state period defines a data writing period of said write signal.

7. A write head current damping circuit, comprising:
   a write head defining a reactive load;
   a write head cable coupled to said write head and defining an impedance load;

a passive damping circuit comprising at least one resistor and at least one capacitor in series, said capacitor coupling said resistor to said write head during a transient period of said write signal and decoupling said resistor from said write head during a steady state period of said write signal.

8. A circuit as claimed in claim 7, further comprising a write driver circuit supplying said write signal to said cable and said write head.

9. A circuit as claimed in claim 7, wherein an equivalent circuit of said cable and said write head comprises an inductive load coupled to a reactive load, respectively.

10. A circuit as claimed in claim 7, wherein said write signal comprises alternating polarities of a DC signal and wherein the transition between said alternating polarities defines said transient period.

11. A circuit as claimed in claim 7, wherein said damping circuit substantially removes an overshoot value of said write signal during said transient period.

12. A circuit as claimed in claim 7, wherein said steady state period defines a data writing period of said write signal.

13. A method for damping the transient response of a write head comprising the steps of:

supplying a write signal to a write head;

using a passive damping circuit comprising at least one resistor and at least one capacitor in series, said capacitor coupling said resistor to said write head during a transient period of said write signal and to decoupling said resistor from said write head during a steady state period of said write signal.

* * * * *